J. R. McWANE.
FOUNDRY PLANT FOR THE PRODUCTION OF CAST IRON PIPES AND OTHER COLUMNAR FORM ARTICLES CENTRIFUGALLY.
APPLICATION FILED MAR. 23, 1920.
1,386,269. Patented Aug. 2, 1921.
5 SHEETS—SHEET 1.
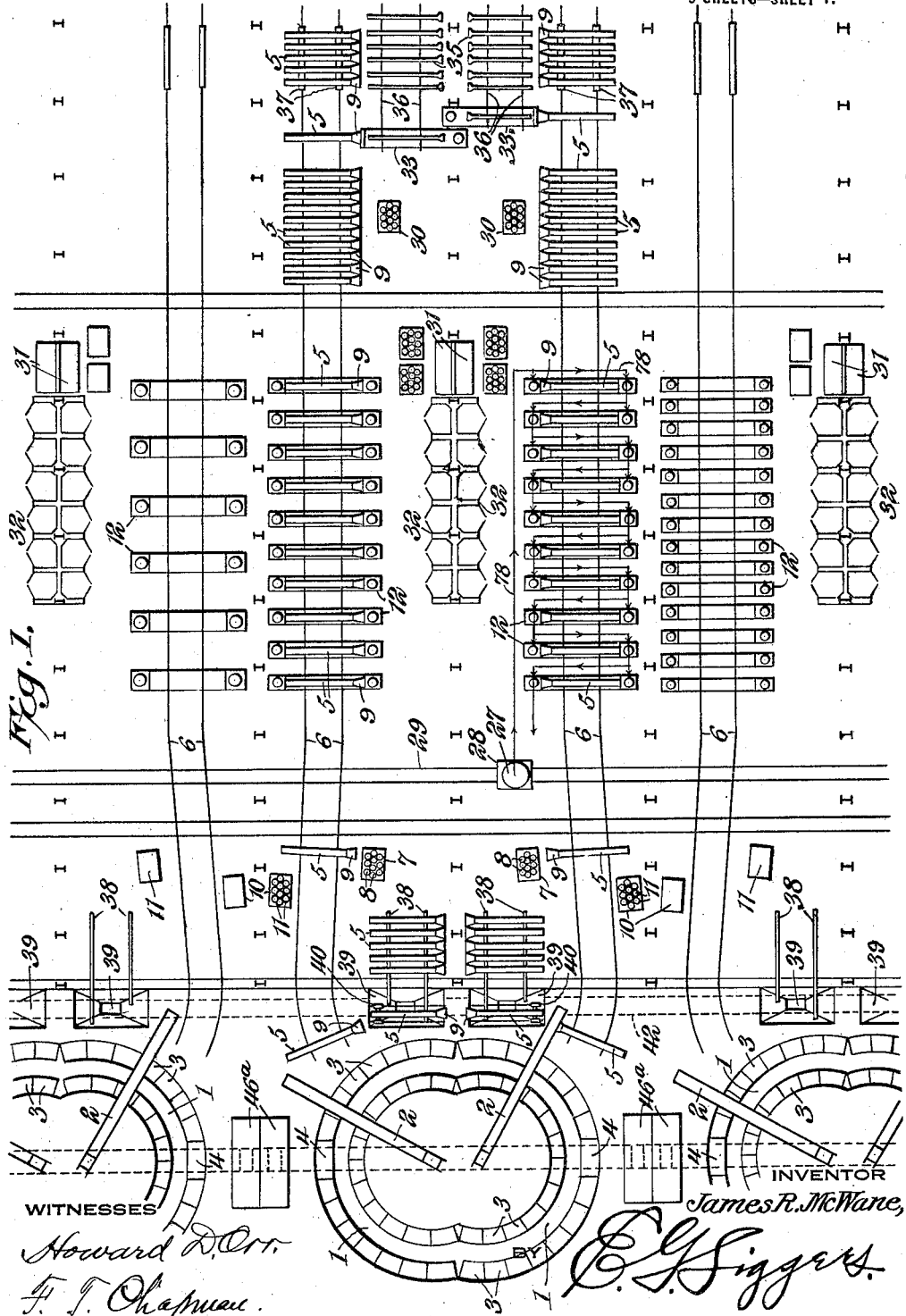

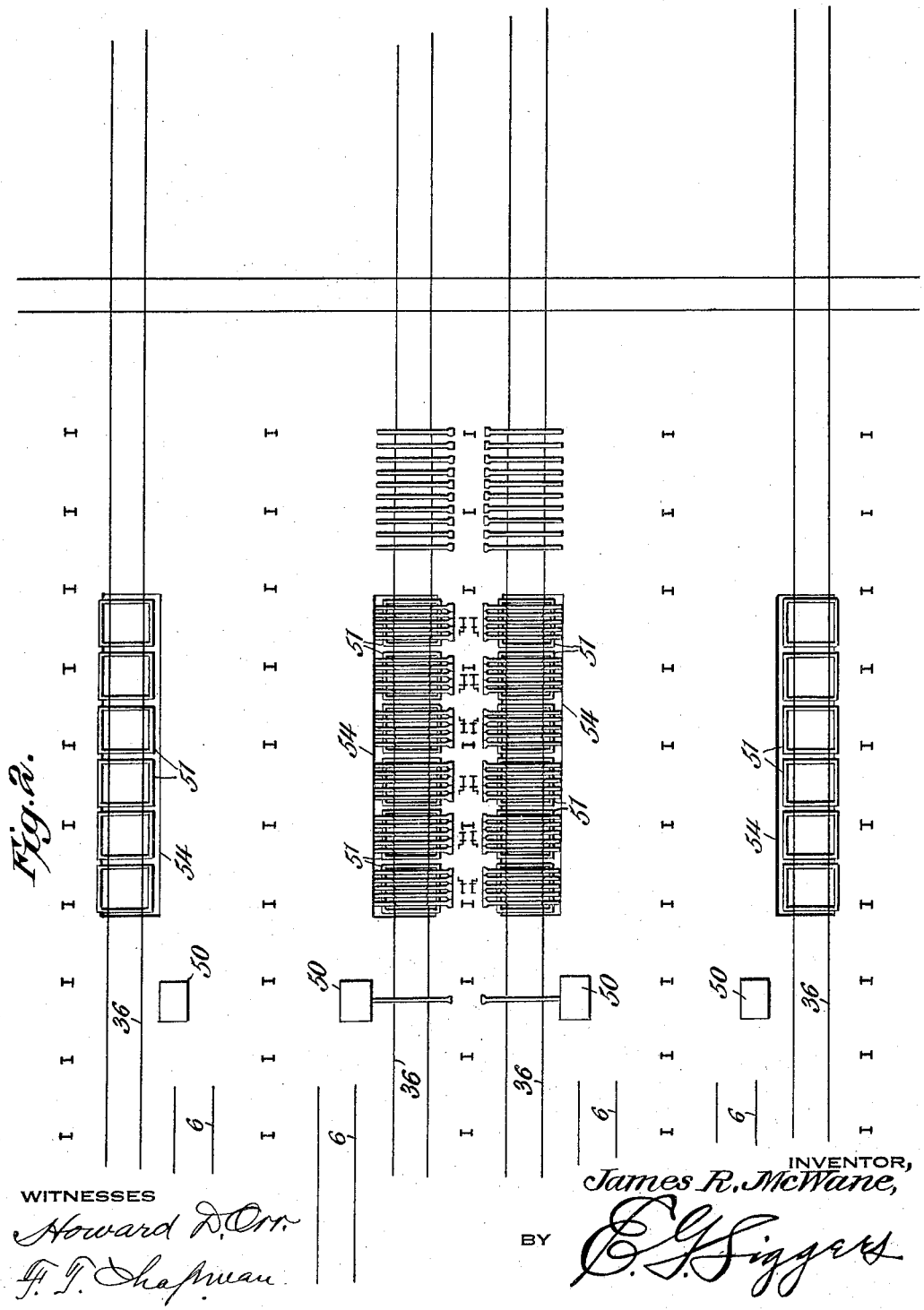

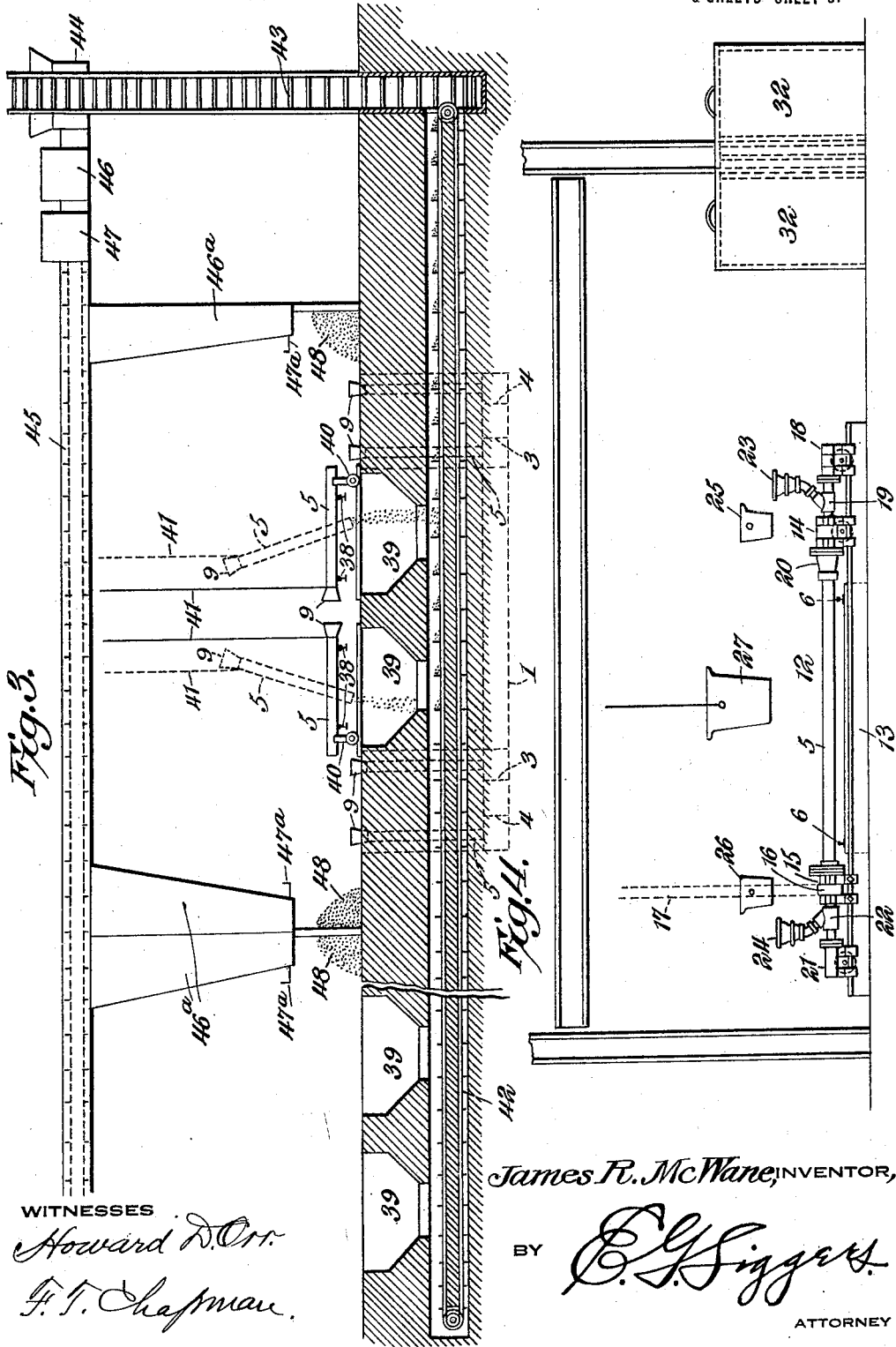

J. R. McWANE.
FOUNDRY PLANT FOR THE PRODUCTION OF CAST IRON PIPES AND OTHER COLUMNAR FORM ARTICLES CENTRIFUGALLY.
APPLICATION FILED MAR. 23, 1920.
1,386,269.
Patented Aug. 2, 1921.
5 SHEETS—SHEET 4.
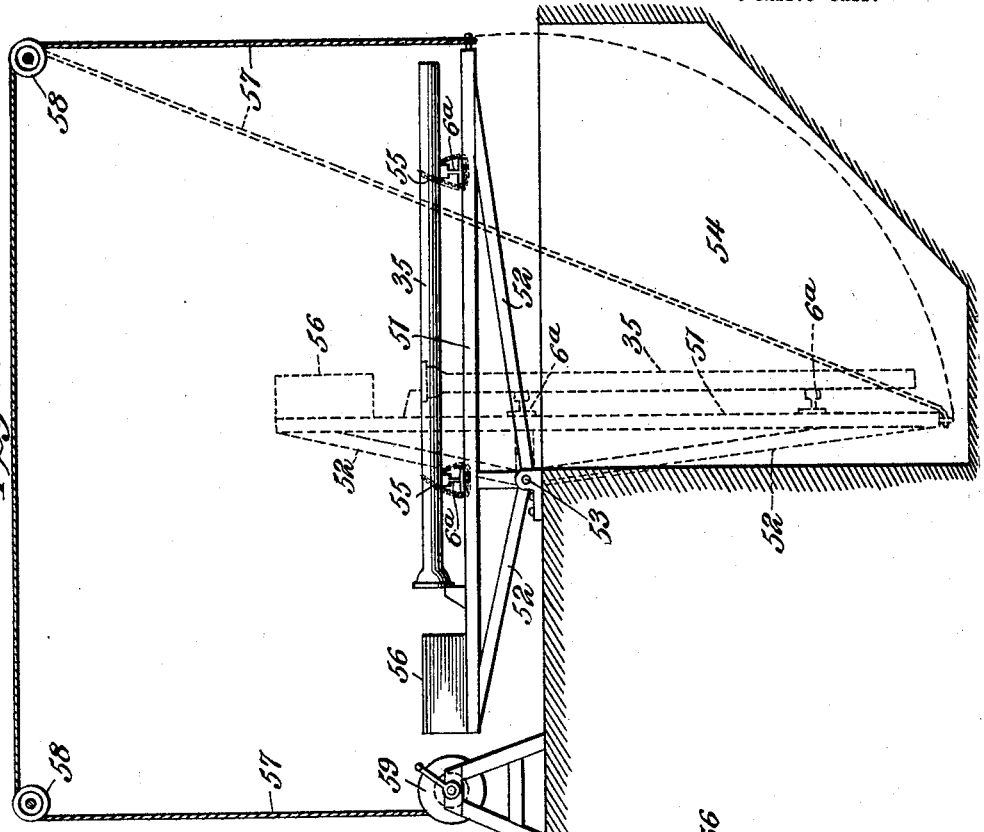
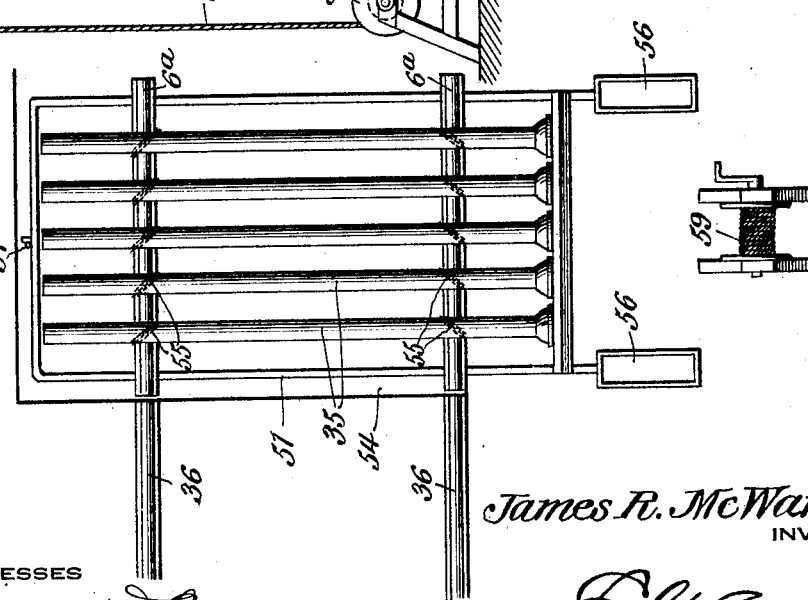
James R. McWane,
INVENTOR,
WITNESSES
BY
ATTORNEY

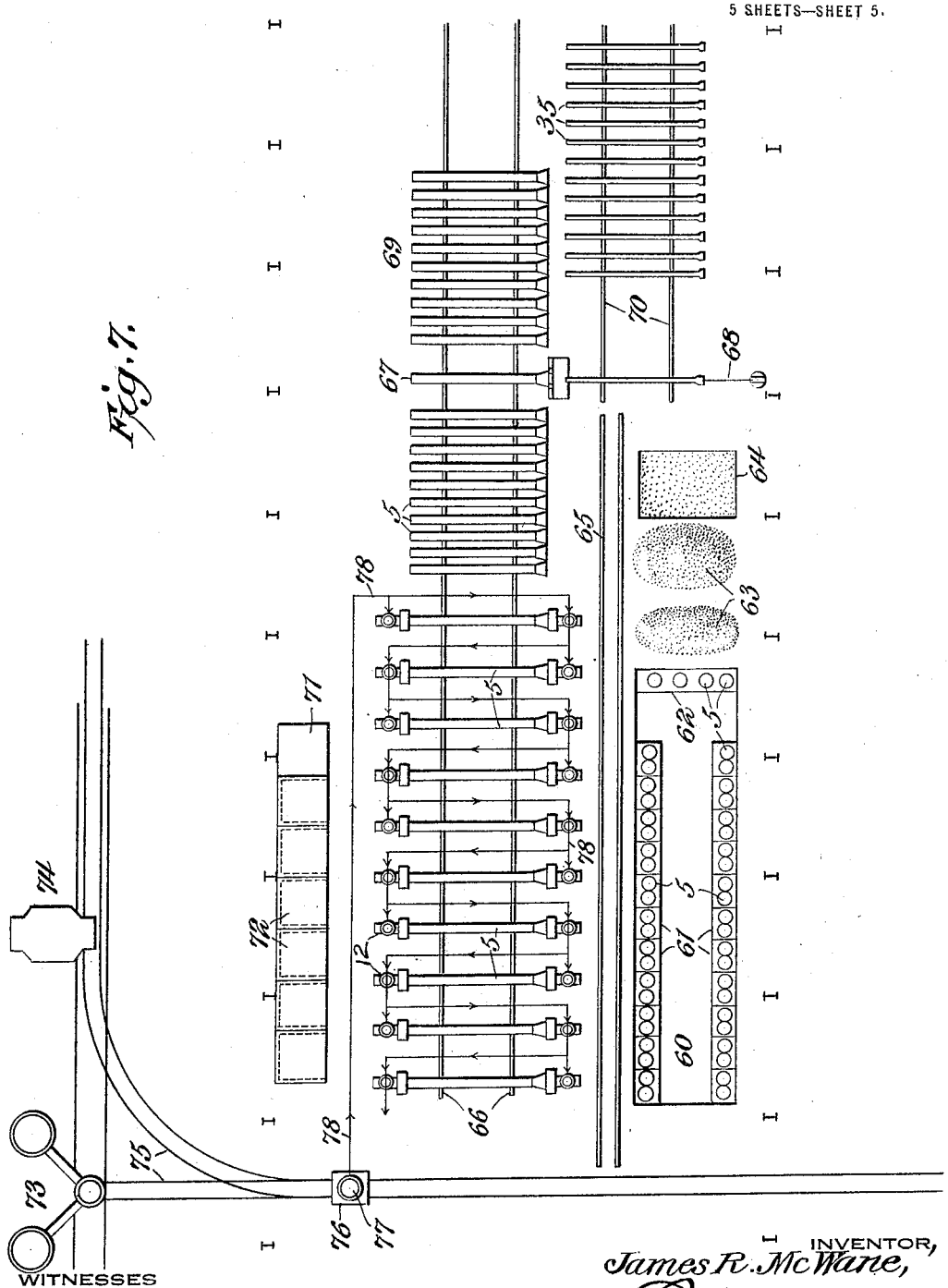

UNITED STATES PATENT OFFICE.

JAMES R. McWANE, OF BIRMINGHAM, ALABAMA.

FOUNDRY PLANT FOR THE PRODUCTION OF CAST-IRON PIPES AND OTHER COLUMNAR-FORM ARTICLES CENTRIFUGALLY.

1,386,269.   Specification of Letters Patent.   Patented Aug. 2, 1921.

Application filed March 23, 1920. Serial No. 368,172.

*To all whom it may concern:*

Be it known that I, JAMES R. McWANE, a citizen of the United States, residing at Birmingham, in the county of Jefferson and State of Alabama, have invented a new and useful Foundry Plant for the Production of Cast-Iron Pipes and other Columnar-Form Articles Centrifugally, of which the following is a specification.

This invention has reference to the adaptation of existing foundry plants for the production of cast iron pipes and other columnar form articles to the centrifugal method of casting and its object is to provide a plant layout in connection with established pipe foundries with the least possible changes, or a new layout wherein the pipes or the like may be produced in batches expeditiously and continuously with a minimum force of workmen.

The pipes, which may be considered as of standard twelve foot or sixteen foot lengths, are formed in rotatable flasks or molds which latter, during the formation of the pipes, are mounted horizontally in suitable machines of lathe-like characteristics and given a requisite speed of rotation while the proper amount of molten metal is within each mold, thus throwing the molten metal against the inner peripheral wall of the mold and holding it there by centrifugal force until the metal has set.

A pipe foundry plant may comprise one or several units each capable of turning out pipe of a certain size and each comprising a pit, or platform or turntable with handling structures, such as cranes for lifting and arranging the shells of the molds to line the latter with suitable material in proper shape to form the pipe. Such units may be utilized for making centrifugal molds but instead of the pipes being cast in a vertical position in a pit or on a turntable the flasks are laid down in a horizontal position and then deposited upon a runway for movement to a location where the molds are mounted in centrifugal casting machines so as to be rotated during the casting operation, after which the castings are withdrawn from the molds with the castings caused to move to another location and the molds returned to the pit to have the molding material removed ready for the production of a new lining for a repetition of the operation. In the adaptation of an existing pipe foundry the casting machines occupy part of the space now used for pipe runs.

The system requires head and tail core rings to close the ends of the molds and also head and tail gates for the casting machines, which gates have longer life than the molds and the head and tail cores thereof. The system also contemplates the return of the molds to the pits for the reformation of the mold linings and the recovery and cleansing of the lining material for re-use. Provision is made for the production of the head and tail core rings and their location in a convenient position for handling and also the pulling of the cast pipe from the molds after the casting operation is finished.

The system also contemplates the employment of means whereby the finished pipe may be so placed as to permit the application of cement or other lining to the pipe and the attachment of prepared joints.

The invention will be best understood from a consideration of the following detailed description taken in connection with the accompanying drawings forming part of this specification, with the understanding, however, that the invention is not confined to any strict conformity with the showing in the drawings, but may be changed and modified so long as such changes and modifications mark no material departure from the salient features of the invention as expressed in the appended claims.

In the drawings,

Figure 1 is a plan view of a pipe foundry layout arranged in accordance with the invention, various parts being diagrammatically represented.

Fig. 2 is a continuation of the right hand end of the showing of Fig. 1.

Fig. 3 is an elevation of the sand handling portion of the plant where the flasks are relieved from their linings and are re-lined.

Fig. 4 is an elevation, more or less diagrammatically represented, of one of the centrifugal machines and adjacent parts.

Fig. 5 is a plan view of the portion of the plant shown in Fig. 2, where the pipes are handled for cement or other lining and the application of prepared joints.

Fig. 6 is an elevation of the structure shown in Fig. 5.

Fig. 7 is a diagrammatic plan view of a pipe foundry modified in certain particulars over the showing of Fig. 1.

Referring to the drawings, and more particularly to Figs. 1 and 2, there is shown at the left hand of Fig. 1 a diagrammatic layout of the mold-forming section of the plant, while the remainder of Figs. 1 and 2 shows the various parts of the layout where the molds are assembled, the pouring is performed, the cast pipe is drawn or pushed from the molds and the molds and pipes are variously handled for different purposes.

The foundry includes one or more pits 1 preferably, though not necessarily, provided with two booms 2 associated for economy of space but not coacting. Arranged about the axis of swinging of each boom are series of drying ovens 3 with the outer row or series of ovens belonging to each boom provided with an intermediate or centrally located ramming table 4.

The arrangement of the pits may be similar to that shown in my Letters Patent No. 1,035,374, for a pipe foundry plant, granted Aug. 13, 1912, although in the procedure described in the patent and with the layout therein disclosed the pipes are cast in upright molds and centrifugal action has no part. The pits may be rectangular or turntables, or ramming platforms may be used.

Instead of casting the pipe in upright molds, as in the aforesaid Letters Patent, the present invention contemplates making the molds vertically as at present but casting of the pipe horizontally with the molds mounted to rotate, so that molten metal may be poured into the mold and the latter rotated about a horizontal axis at such speed as to throw the molten metal against the inner wall of the mold, thus building up the wall of the pipe centrifugally, with the rotation of the mold continued until the metal chills and becomes set, after which the pipe is pulled or pushed endwise from the mold for such subsequent treatment as may be found advisable or necessary.

The boom or booms 2 are used when it is desirable to handle the molds.

The operation may be considered as beginning with the preparation of a flask with a temporary lining of refractory material, say sand or the like in a green state, the shell of the mold being placed upon a ramming table 4 by a boom 2, while a suitable pattern is installed in the shell and the space between the pattern and the shell is rammed full of the molding material. After this the pattern is withdrawn and the mold is placed over one of the ovens 3 so that the lining material becomes dried and hardened to a sufficient extent to hold its shape during subsequent operations. The outer shells of the molds or flasks are indicated in different views of the drawing at 5. When a flask is lined with sand and is ready for further use, it is carried by a boom 2 and deposited upon a track or run formed of rails 6, such track being so arranged as to be capable of permitting the flasks to roll from the pits 1, where these flasks are lined, to other parts of the plant for the casting of the pipes and for subsequent treatment.

Although the layout may comprise two or more tracks and other parts, it is only necessary for an understanding of the operation of the plant to consider one track 6. When a flask with a suitable lining is deposited upon the track 6 by the boom 2 carrying it, the track 6 has a suitable inclination or may be approximately level so that the flask will gravitate along the track or may be pushed therealong by workmen. At appropriate points along the track 6 is a table 7 carrying a suitable number of head core rings 8, this table being so located as to be conveniently situated with respect to the bell end of the flask, which bell end is indicated at 9. There is also provided another rack 10 with other core rings 11 for the spigot end of the pipe, the head and tail core rings constituting closures for the respective ends of the pipe flask.

At a suitable distance along the track 6 from the beginning of the track is located a series or battery of centrifugal casting machines 12 shown somewhat in detail, though still in part in diagram, in Fig. 4 and shown, described and claimed in my application Serial No. 368,171 filed March 23, 1920, for a centrifugal pipe casting machine. In order that the operation of such machine may be better understood, a brief description thereof as the machine is shown in Fig. 4, is herewith given. Each casting machine comprises a bed 13 carrying a head stock 14 near one end and a tail stock 15 near the other end, the tail stock having a pulley 16 thereon which may be driven by a belt 17 indicated in dotted lines in Fig. 4. Associated with the head stock is an adjustable carriage 18 carrying a pouring spout 19 movable by the carriage 18 into and out of the mold 5 through the bell end 9 thereof, such end being the one with which the bell end of the pipe is formed, it being assumed that the mold 5 is for the purpose of forming cast iron pipe of the bell and spigot type. A similar carriage 21 is associated with the spigot end of the pipe mold and this carriage supports a pouring spout 22 movable into and out of the corresponding end of the mold 5. The spout 19 has an upstanding funnel 23 leading into it and the spout 22 has a similar funnel 24 leading into it.

As the mold 5 is rolled along the track 6 until opposite the head and tail stocks 14 and 15, further movement is there arrested and by means which need not be here described but which are shown and described in the aforesaid application Serial No. 368,171 for a centrifugal casting machine, the pipe mold is lifted free of the tracks and is centered in the head and tail stocks and there fastened so that when the belt 17 is actuated the pipe mold 5 is rotated at a suitable speed, which, in practice, may be from five hundred to one thousand revolutions per minute.

Supported adjacent to the funnels 23 and 24 are respective pouring ladles 25 and 26 mounted to tilt in such a manner that when molten metal is to be deposited in the mold 5, the ladle 25, which is adjacent to the funnel 23, is tipped appropriately and in such timed relation to the ladle 26 that about half the contents of the ladle 25 is deposited in the funnel 23 before the ladle 26 begins to discharge, whereupon the ladle 26 then discharges simultaneously with the ladle 25 but at a faster rate so that by the time the ladle 25 has discharged its contents with the exception of an amount equal to a portion of the capacity of the bell end 9, the ladle 26 is completely emptied and the determined amount of metal is withheld in the ladle 25. Then rotation of the flask 5 is started, this causing the throwing out of the molten contents of the mold toward the outer wall of the mold chamber, thus depositing a layer of molten metal on the inside of the mold corresponding to the intended thickness of the finished pipe. However, because of the greater diameter of the bell end of the mold, the molten metal is forced outwardly in the bell end, completely filling it and robbing the wall of the pipe adjacent to the bell end of a portion of the metal which would otherwise be lodged therein. This leaves a thin place in the pipe which is thereupon filled up by discharging the temporarily withheld metal in the ladle 25 into the bell end of the pipe at the thinned portion thereof so that the walls of the pipe become thickened up to the proper extent. The rotation of the pipe mold or flask is then continued until the metal has cooled and set.

The centrifugal machines are arranged in groups or batteries for convenience of operation. For large diameter pipe, the number of machines in a group or battery may be considerably less than for small diameter pipe. A suitable amount of molten metal is obtained from a supply thereof by means of a large ladle 27 which may be carried on a car 28 running on a transverse track 29 extended crosswise of the layout or yard, and then when reaching the position of a battery of centrifugal machines, the large ladle is lifted by an appropriate traveling crane and carried back and forth so as to pour into the smaller ladles 25 and 26 until all the ladles of a battery or group of centrifugal machines are filled. In placing the flasks in the battery of centrifugal machines, the first flask to reach the battery of machines is moved to the last machine in order and centered thereon, the second flask is carried to the next to the last centrifugal machine, and so on until the last flask is secured to the first machine from the pits 1. Then the pouring into the flasks begins at the first located flask and proceeds in order to the last flask of the battery so that the operations proceed orderly and continuously. The pouring into the smaller ladles begins at alternate ends of the flasks; that is, if the first small ladle filled at the first flask is at the bell end the first small ladle filled at the second flask will be at the spigot end, and so on. The arrangement is such that the lining of the flasks, the placing of the head and tail core rings, the pouring of the metal, and the removal of the flasks from the casting machines is performed with great rapidity due to the order in which the flasks are placed in the battery of machines and removed therefrom so as to offer no impediment one to the other.

As the flasks with the pipes therein are removed from the casting machines, they are rolled along the tracks 6 each to the extracting position for the pipe. The head and tail core rings are then removed and placed upon racks 30 to be carried to a work table 31 conveniently located and having bake ovens 32 associated therewith so that the destructible portions of the core rings may be re-built and baked ready to be carried to the positions 7 and 10 for re-application to flasks already lined, to be again mounted on the centrifugal machines for a repetition of the casting operation. Near the point where the flasks with the pipes therein have the head and tail core rings removed, there is provided a pipe puller 33 in alinement with which the flasks 5 are moved upon the track 6 for operating thereon. The pipe puller or pusher may be substantially like the core bar pulling and cutting apparatus disclosed in my Letters Patent No. 967,039, granted August 9, 1910, and therefore not shown in detail in the drawings.

As the pipes, indicated at 35, are removed from the flasks, they are rolled off on tracks 36, while the flasks, without the pipes, pass onto frames 37, where they may be gathered up into groups by chains or the like to be carried in horizontal position, by an overhead crane, not shown, back to tracks 38, the groups of flasks being preferably only half the number of the flasks operated upon by a bank of centrifugal machines. The flasks are carried along the tracks 38 over shake-out pits 39 where the spigot end of the flask is supported on an up-ending truck 40 and the end of the flask is engaged by a chain 41 by which it may be lifted so as to up-end the flask. When the pusher or puller apparatus for removing the pipe from the flask was operated, the lining originally inserted in the flask was cut or scored, as described in the Letters Patent referred to, so that when the flask is up-ended over the pit 39 the lining material readily drops out.

Passing beneath the pits 39 is an endless conveyer 42 carrying the discharged material to an elevating conveyer 43 at one end of the foundry in turn carrying the material to a screening apparatus 44 at a suitable height and traversed by a conveyer 45 passing through a mixer 46 and beater 47, which devices are not shown in detail as their construction forms no part of this invention. At suitable intervals the conveyer 45 discharges into depending bins 46$^a$ at the lower ends of which are gates 47$^a$ controlling the deposition of material in piles 48 adjacent to work or ramming tables 4 where the flasks are furnished with their linings formed of the material 48.

After the pipes have been extracted from the molds, they pass along the tracks 6 past cutters 50 indicated in Fig. 2, these cutters trimming off the spigot ends of the pipes so that these pipes have smooth ends. After passing the cutters, and then being tested the pipes are rolled upon frames 51 shown in Fig. 2, but better shown in Figs. 5 and 6. Each frame includes a short track made up of rails 6$^a$ capable of being brought into register with the rails 6 and the frames 51, of which there may be several, have their tracks in alinement so that when all the frames are in normal position the tracks form continuations of each other and of the track rails 6. Each frame 51 is mounted on truss supports 52 having pivotal mountings 53 at one edge of a pit or depression 54 into which the frame may swing about a substantially horizontal axis represented by the pivotal mounting 53. The construction is such that the frame 51 normally overbalances toward an upright position with the longer end of the frame in the pit 54. The pipes 35 are rolled upon the frame 51 in groups, say five to a group, such number being readily handled by the crane, although such particular number is not obligatory. Each pipe is made fast to the rails 6$^a$ by chains 55 or any other suitable manner, whereby the pipes 35 participate in rocking movements of the frame 51. Since the frames 51 overbalance toward the pit 54, especially when loaded with pipes 35, counterweight boxes 56 are mounted on the frame at the end remote from that overhanging the pit 54. The end of each frame 51 remote from the counterweighted portion 56 has one end of a rope or cable 57 attached thereto and this rope is carried over direction-changing sheaves or pulleys 58 to a windlass 59 in convenient position to be controlled by an operator, although the rope and windlass may be replaced by any other means which will answer the purpose.

When a frame full of pipes is tilted so that the pipes 35 stand upright, such pipes may be readily lined with cement or other coating, protecting and smoothing the interior of the pipes.

In the production of joints for bell and spigot pipes, it is at times desirable to introduce packing in the joint at the factory, this being conducive to economy and efficiency of the joint. Such foundry-prepared joint is shown and described in my Letters Patent No. 1,270,309, granted June 25, 1918, and No. 1,288,092, granted Dec. 17, 1918, where the construction and advantages of such a prepared joint are set forth. The structure shown in Figs. 5 and 6 is particularly adapted to the formation of such joints as well as for the lining of the pipe with cement or other material.

In the plant described with reference to Fig. 1 and associated figures, the layout is one which may be readily adapted to existing plants for the production of cast iron pipe. In Fig. 7, there is shown a layout otherwise arranged from that shown in Fig. 1 and disclosing a unit for the centrifugal production of cast iron pipe where the layout is of more compact nature than that of Fig. 1. So far as the general procedure is concerned and the apparatus employed, the layout of Fig. 7 is substantially the same as that of Fig. 1.

Instead of providing curved pits, as in Fig. 1, the arrangement of Fig. 7 employs straight pits 60 flanked on opposite sides by drying ovens 61 and at one end provided with a ramming table 62, the latter being located adjacent to a position where piles 63 of lining material for the pipes may be dumped, such piles accumulating adjacent to a bin 64 like the bins 46$^a$ of Fig. 3.

Adjacent to the pit 60 is an overhead track or runway 65 for a traveling crane designed to handle flasks 5 either being rammed on the table 62 or lodged over the ovens 61 or in other adjacent positions.

Adjacent to the pit 60 is a track or pipe run 66 traversing a battery of centrifugal machines 12 like those shown in connection with Fig. 1 and described and separately indicated in Fig. 4, and which machines in Fig. 1 are traversed by the track or pipe run 6. A crane (not shown) mounted on the track 65, may be utilized for placing the prepared flasks 5 in the centrifugal machines and mounting them for rotation the same has has been described with reference to Fig. 1. After the centrifugal casting is completed, the flasks 5, with the cast pipe therein, are released from the machines and rolled on the track 66 to the pipe-removing position indicated at 67 in Fig. 7, with the pipe-drawing apparatus indicated at 68. The empty flasks are then rolled along the track 66 to another position indicated at 69, while the withdrawn pipes 35 are rolled along another track 70 for treatment similar to the arrangement shown in Fig. 2 but not shown in Fig. 7.

The flasks are provided with head core and tail core rings, as in the structure of Fig. 1, and suitable core benches, of which one is shown at 71 in Fig. 7, and suitable ovens shown at 72 in Fig. 7, are provided for the making of the core rings, the same as in Fig. 1, but the showing of which is not elaborated in Fig. 7.

Molten metal for producing pipe is provided by a cupola 73 or an electric furnace 74, or both. Tracks 75 for a car 76 permit the transportation of a ladle 77 from the cupola or furnace to other ladles 25 and 26 at opposite ends of the casting machines, the same as in the arrangement of Fig. 1. The path of the ladle 77 into discharging relation to the ladles 25 and 26 is indicated in Fig. 7 by the line 78 having numerous direction-indicating arrow heads thereon, the path of the ladle 77 being the same as that indicated in Fig. 1.

Since the operation of the system illustrated in Fig. 7 is substantially the same as that of the system shown in Fig. 1, it is deemed unnecessary to repeat it. Furthermore, it is deemed unnecessary to show in Fig. 7 the layout illustrated in Figs. 2, 5 and 6, for it is to be assumed that in a new construction which Fig. 7 is intended to represent, certain parts shown in Figs. 1 and 2 will be reproduced.

What is claimed is:

1. A pipe foundry plant including a pit with means thereat for lining flasks with refractory material, a pipe run extending from the pit toward the other end of the plant, a group or battery of centrifugal casting machines in the line of the pipe run, means for extracting the pipes from the flasks, means for returning the flasks to the pit for cleansing and re-lining, and means for disposing of the formed pipes.

2. A pipe foundry plant including a pit with means thereat for lining flasks with refractory material, a flask run leading from the pit and along which the flasks may be conveyed, means for applying head and tail core rings to the respective ends of the flasks, a group or battery of centrifugal casting machines in the flask run for receiving the flasks therein, means for depositing molten metal in opposite ends of each flask, and means for extracting the pipes from the flasks after being removed from the machines.

3. A pipe foundry plant including a pit with means thereat for lining flasks with refractory material, a flask run leading from the pit and along which the flasks may be conveyed, means for applying head and tail core rings to the respective ends of the flasks, a group or battery of centrifugal casting machines in the flask run for receiving the flasks therein, means for depositing molten metal in opposite ends of each flask, and means for extracting the pipes from the flasks after being removed from the machines, the plant also including means for returning the flasks to the pit for re-lining.

4. A pipe foundry plant including a pit with means thereat for lining flasks with refractory material, a flask run leading from the pit and along which the flasks may be conveyed, means for applying head and tail core rings to the respective ends of the flasks, a group or battery of centrifugal casting machines in the flask run for receiving the flasks therein, means for depositing molten metal in opposite ends of each flask, and means for extracting the pipes from the flasks after being removed from the machines, the plant also including means for returning the flasks to the pit for re-lining, and means for trimming the pipes.

5. A pipe foundry plant including a pit with means thereat for lining flasks with refractory material, a flask run leading from the pit and along which the flasks may be conveyed, means for applying head and tail core rings to the respective ends of the flasks, a group or battery of centrifugal casting machines in the flask run for receiving the flasks therein, means for depositing molten metal in opposite ends of each flask, and means for extracting the pipes from the flasks after being removed from the machines, the plant also including means for returning the flasks to the pit for re-lining, and means for mounting the pipes to locate them in vertical position for subjecting them to lining or other operations.

6. A pipe foundry plant including pits with ovens and ramming tables for flasks, runs leading from the pits to distant parts of the plant for receiving flasks, centrifugal casting machines for receiving lined flasks, means for providing head and tail core rings for the flasks, means for supplying the opposite ends of each of a series of flasks with molten metal, means for rotating the flasks for the centrifugal deposition of molten metal on the inner walls of the flasks to form pipes, and means for extracting the pipes from the flasks for the return of the empty flasks to the lining section of the plant for re-lining.

7. A pipe foundry plant including means located at one portion of the plant for lining pipe casting flasks, means for transferring the lined flasks from the lining position to distant parts of the plant, groups or batteries of centrifugal casting means into which the flasks are delivered in order in the horizontal position, means for directing molten metal into the horizontally positioned flasks in the same order in which the flasks are delivered into the casting machines, means for rotating the flasks axially until the metal has set, means for extracting the pipes from the flasks after the latter are removed from the centrifugal machines, and means for returning the flasks to the pipe flask lining location for relining.

8. A pipe foundry for the centrifugal production of cast iron pipe provided with a group or battery of horizontally arranged rotatable carriers for elongated flasks, with each carrier having pouring means for molten metal at both ends, means for preparing the flasks for introduction into the carriers, and means for the feeding of molten metal to the carriers and flasks successively.

9. A pipe foundry plant including means for lining flasks with refractory material to form molds for the pipe, means for preparing the closures for the ends of the flasks, a battery or group of rotatable centrifugal casting machines for receiving the flasks, and means for pouring molten metal into the opposite ends of the flasks in chosen order beginning with the flask most remote from the first-named means.

10. A pipe foundry plant including a pit with means whereby flask shells may be lined with refractory material to produce molds for the exterior walls of the pipe, means for preparing closures for the ends of the flasks, a group or battery of rotatable centrifugal casting machines for receiving and rotating the lined flasks, said machines having head and tail stocks and pouring gates for said head and tail stocks, means for supplying flasks mounted in the pouring machines with molten metal at both ends, and means for extracting the pipes from the flasks for the separate disposition of both the flasks and pipes.

11. A pipe foundry plant including a flask pit, a run extending from the pit toward the other end of the plant for conveying lined flasks, a group or battery of centrifugal pipe casting machines in the line of the run, and means for extracting the pipes from the flasks for the return of the empty flasks to the pit and the separate disposition of the pipes.

12. A pipe foundry plant including a pit, means at the pit for lining flasks preparatory to the casting of pipes therein, a run extending from the pit toward the other end of the plant for conveying prepared pipe casting flasks, and a group or battery of rotatable centrifugal casting machines having means for supporting and rotating the flasks in a horizontal position and provided with pouring means for molten metal at opposite ends, whereby pipes may be centrifugally cast in succession and the procedure is made a continuous one.

13. In a pipe foundry plant, a flask pit, a run extending therefrom for delivering pipe molds, a group or battery of centrifugal pipe casting machines through which the run extends with the casting machines arranged to support the flasks horizontally in order for the pouring of metal into both ends of the flasks and then rotating the latter each about a horizontal axis, pipe extracting means for removing the cast pipe from the flasks, and means for removing the flask linings therefrom to permit re-lining of the flasks each time they are used.

14. In a pipe foundry plant, means for the preparation of pipe flasks or molds with lining for the centrifugal casting of pipe, a group or battery of centrifugal casting machines each adapted to support a mold in a horizontal position with the molds of the group or battery in close serial relation, means for handling molten metal and pouring it into opposite ends of the horizontally supported molds with the latter rotatable about a horizontal axis to cause the centrifugal deposition of the molten metal on the inner walls of the molds for there setting, and means whereby the cast pipes are extracted from the molds and the pipes and molds are disposed of separately, with the molds returning to the portion of the plant where they are first lined.

15. In a pipe foundry plant, means for the production of pipe molds for the centrifugal casting of pipe, a group or battery of centrifugal casting machines each adapted to support a mold in a horizontal position with the molds of the group or battery in close serial relation, means for handling molten metal and pouring it from a reservoir or supply receptacle into smaller receptacles so placed with reference to each other that the reservoir or supply may be moved progressively from one machine to the other and from the small receptacle at one end of the machine to the small receptacle at the other end of the machine without lost motion or retrogression.

In testimony that I claim the foregoing as my own, I have hereto affixed my signature.

JAMES R. McWANE.